United States Patent [19]

Hoff

[11] 4,416,107
[45] Nov. 22, 1983

[54] LAWN MOWER BLADE CONTROL MECHANISM

[75] Inventor: Stephen J. Hoff, Richmond, Ind.

[73] Assignee: Hoffco, Inc., Richmond, Ind.

[21] Appl. No.: 369,121

[22] Filed: Apr. 16, 1982

Related U.S. Application Data

[63] Continuation-in-part of Ser. No. 158,700, Jun. 12, 1980, Pat. No. 4,362,368.

[51] Int. Cl.$^3$ .............................. A01D 69/10
[52] U.S. Cl. .................. 56/11.3; 192/17 R; 188/166; 188/170
[58] Field of Search ............. 56/11.3, 11.6, 11.8; 192/17 R, 17 A, 17 C, 35; 74/520; 29/468; 188/166, 170, 77 R, 77 W, 249, 259

[56] References Cited

U.S. PATENT DOCUMENTS

| | | | |
|---|---|---|---|
| 2,309,995 | 2/1943 | Strandlund | 192/17 R |
| 3,253,391 | 5/1966 | Meldahl | 56/11.3 |
| 3,991,469 | 11/1976 | Frederickson | 188/166 |
| 4,026,392 | 5/1977 | Hirschkoff | 188/166 |
| 4,035,994 | 7/1977 | Hoff | 56/11.3 |
| 4,044,533 | 8/1977 | Wick | 192/17R |
| 4,152,881 | 5/1979 | Hoff | 56/11.3 |
| 4,205,737 | 6/1980 | Harkness et al. | 192/17 R |
| 4,226,312 | 10/1980 | Zindler | 56/11.3 |
| 4,297,829 | 11/1981 | Hoff | 56/11.3 |
| 4,316,355 | 2/1982 | Hoff | 56/11.3 |
| 4,326,368 | 4/1982 | Hoff | 56/11.3 |

Primary Examiner—Gene Mancene
Assistant Examiner—David I. Tarnoff
Attorney, Agent, or Firm—Barnes & Thornburg

[57] ABSTRACT

A combined safety clutch and brake mechanism for a rotary lawn mower blade has a driven blade carrier with self-energizing centrifugal shoes biased to engagement with a driving drum. Brake drum segments fixed to the shoes are engaged by a brake band which physically forces the shoes to declutched position. To ensure reliable operation, the brake band is connected to a lever arm which is strongly biased to brake-ON position by a coil spring engaged about a guide rod and disposed along the movable end portion of the brake band, in a chordal position between the band and a surrounding protective bowl. The geometry of the lever arm and spring thrust line progressively reduces the force required to actuate the brake band to OFF position, relative to the spring force, as the lever arm is moved and the spring compressed.

17 Claims, 7 Drawing Figures

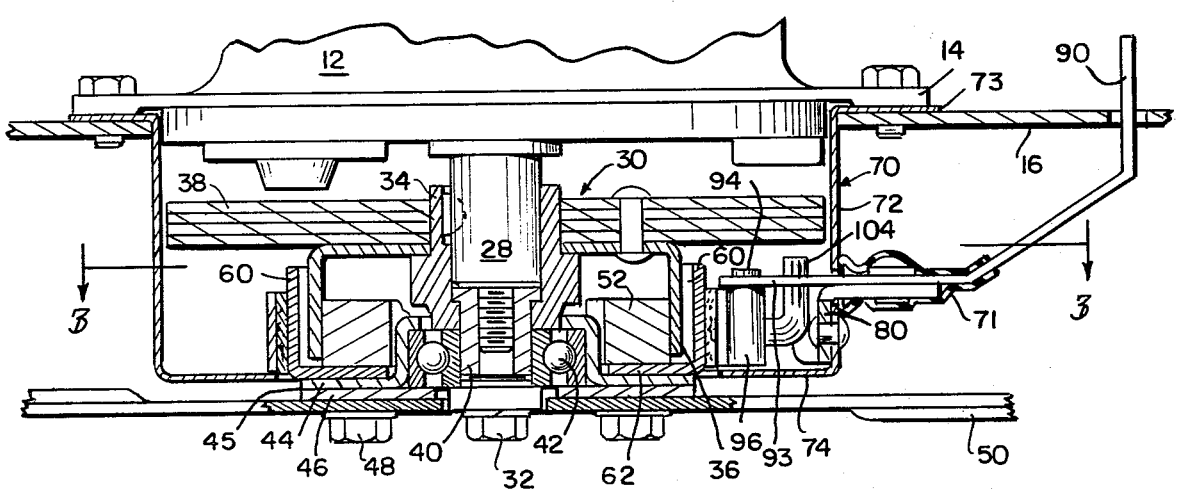

LAWN MOWER BLADE CONTROL MECHANISM

This is a continuation-in-part of application Ser. No. 06/158,700, filed June 12, 1980, now U.S. Pat. No. 4,362,368.

This invention relates to lawn mower safety blade control mechanism, and more particularly to control mechanism for a combined clutch and brake which for safety purposes is interposed between the driving engine and the blade carrier of a rotary blade lawn mower.

U.S. Pat. No. 4,362,368, referred to above, discloses a clutch and brake mechanism for a rotary lawn mower blade, in which the driving engine shaft carries a driving drum and the blade carrier has pivoted shoes which are spring-pressed outward into engagement with the inner surface of such drum and which are integrally connected with semi-cylindrical brake drum segments disposed outside such drum in position to be engaged by a brake band which, when applied, both physically forces the brake segments and connected shoes inward to a clutch-released position and applies a braking force to the cylindrical brake segments. When the brake is applied, the blade carrier is thus de-clutched from the driving drum and braked to a stop in a very short time, for example, within one second and certainly within the three seconds required by the Safety Standard of the U.S. Consumer Product Safety Commission which is applicable to walk-behind lawn mowers manufactured after June 30, 1982. The brake band in that mechanism is biased to brake-ON position by a tension spring attached to the outer end of a brake lever connected at its inner end to the movable end of the brake band, and the brake lever is connected for movement to a brake-released position by manual actuation of a deadman control on the handle of the lawn mower. Such deadman control must be held in actuated position by the operator during operation of the lawn mower. When the deadman control is released, the biasing spring drives the brake to a brake-ON position.

Operation of such a clutch and brake mechanism requires, on the one hand, that the pivoted clutch shoes carried by the driven blade carrier be urged by their biasing spring and by centrifugal force into clutching engagement with the driving drum in such a way as to provide a smooth but prompt clutch engagement which accelerates the heavy blade to its cutting speed quickly but without overloading and stopping the driving engine. On the other hand, the clutch shoes must be sufficiently self-energizing so that they promptly establish a driving connection between the driving drum and the blade carrier which is substantially locked up and does not slip under mowing load on the blade. Slipping conditions can easily generate sufficient heat to destroy the mechanism. For the intended safety purposes, moreover, the release or declutching of such locked-up clutch shoes must occur with certainty and quickly when the deadman control is released by the operator so that the blade will be positively stopped before the operator can move from a safe operating position to a position in which he is in danger of injury from the rotating blade.

Under these circumstances, it is essential that the biasing means which biases the brake to brake-ON position be one which acts with certainty and with sufficiently high force to positively declutch the locked-up clutch shoes and that it be one which is not likely to fail in use.

The provision of a practical blade control is complicated by a number of other factors. A blade clutch and brake mechanism must be located at the point of connection of the blade to its driving shaft, and this is located below the mower deck and in the space in which the cutting blade operates. This presents highly adverse environment, and mechanism of the type here involved requires protection from that environment. Also, with separate brake drum segments and for maximum braking force, the brake band should have only a small gap between its ends and should extend as nearly as possible through a complete circle. Such matters and practical consideration of manufacture and assembly impose severe space and design limitations on the manufacture and placement of control mechanism.

With prior lawn mower blade brake mechanisms, it has been a common practice to bias the brake with tension springs which are susceptible to failure not only throughout their length, but also at their formed ends by which they are connected to related parts, and which in the event of breakage, completely release the connected parts. In a lawn mower blade control such as here involved, such release would completely inactivate the brake so that the blade would not be stopped by release of the deadman control. This would completely destroy the essential safety feature for which the mechanism is required to be provided.

It is an object of the present invention to provide a brake-actuating mechanism which is effective and reliable for purposes of positively controlling a lawn mower blade clutch and brake and for providing desired safety features; and which is compact and practical to manufacture and assemble.

In accordance with the invention, the brake-biasing spring is a strong compression spring mounted along and closely adjacent the brake band itself in a position in which it acts positively on the movable end of the brake band and where it and the brake-release mechanism can be protected from damage and from exposure to the blade chamber in which the mowing operation occurs. The clutch-brake mechanism is mounted on the depending end of the engine shaft, below the deck of the mower, and such mechanism desirably includes a flywheel rotatable with the shaft and driving drum. Such mechanism is enclosed in a protective bowl having a cylindrical side wall hung from the deck of the mower, below the mounting flange of the engine, and having a flat bottom wall which terminates with its inner periphery closely surrounding but in clearance relation with the brake segments of the clutch-brake mechanism. The brake band srrounds the cylindrical brake segments and is anchored at its fixed end between the bottom wall of the bowl and a support arm fixed to the bowl. The movable end of the brake band is connected, as with a pin, to the inward arm of a brake lever pivoted to an outward-extending arm on the bowl. The two ends of the band desirably lie circumferentially close to each other, and radially close to the path of the brake drum segments. The outward arm of the brake lever may be formed in various ways to suit the design of the lawn mower, and is here shown as being bent upward to extend through a slot in the deck of the lawn mower for engagement by an actuating cable.

The brake band biasing compression spring is mounted about a guide rod pivoted to the inward arm of the brake lever as by an upturned end extending through a pivot hole closely adjacent the pin to which the movable end of the brake band is connected. The spring acts between an abutment on the rod and spring-reaction support carried by the bowl. The biasing spring is a heavy strong spring of considerable length, so as to exert a strong biasing force but to undergo not more than a reasonable degree of compression as the brake lever is actuated from brake-ON to brake-OFF position. The spring and its guide rod extend chordally across the annular bottom wall of the bowl between the side wall of the bowl and the brake band. The geometry of the system, particularly that of the center line through the spring and the like from the pivot axis of the brake lever to the pivot axis of the spring guide rod in such lever, is such that the spring acts at an angle close to a right angle on the brake lever so as to have a maximum component of force tending to move such brake lever to brake-ON position, but at an angle greater than a right angle so that when the brake lever moves to a brake-OFF position, such angle is substantially increased and the component of force of the spring tending to rotate the brake lever about its pivot axis is reduced relative to the force of the spring itself. In effect, the angle is such that the swinging movement of the brake lever from ON to OFF reduces the effective length of the lever arm through which the spring force acts. Such geometry provides that the spring will have a strong biasing action to move the brake to ON position, but that the force required to manually actuate the brake lever to brake-OFF position will be not greatly increased as the result of the compression of the spring which occurs as the brake lever is moved to brake-OFF position, and may indeed be reduced relative to the component of force which holds the brake lever in ON position.

The accompanying drawings illustrate the invention and show a preferred embodiment of the invention exemplifying the best mode of carrying out the invention as presently perceived. In such drawings:

FIG. 1 is a somewhat diagrammatic side elevation of a lawn mower equipped with a clutch and brake and control mechanism in accordance with the invention, with near-side parts of the mower deck broken away and the near-side wheels of the lawn mower omitted;

FIG. 2 is a section taken on the line 2—2 of FIG. 1;

Figure 3:
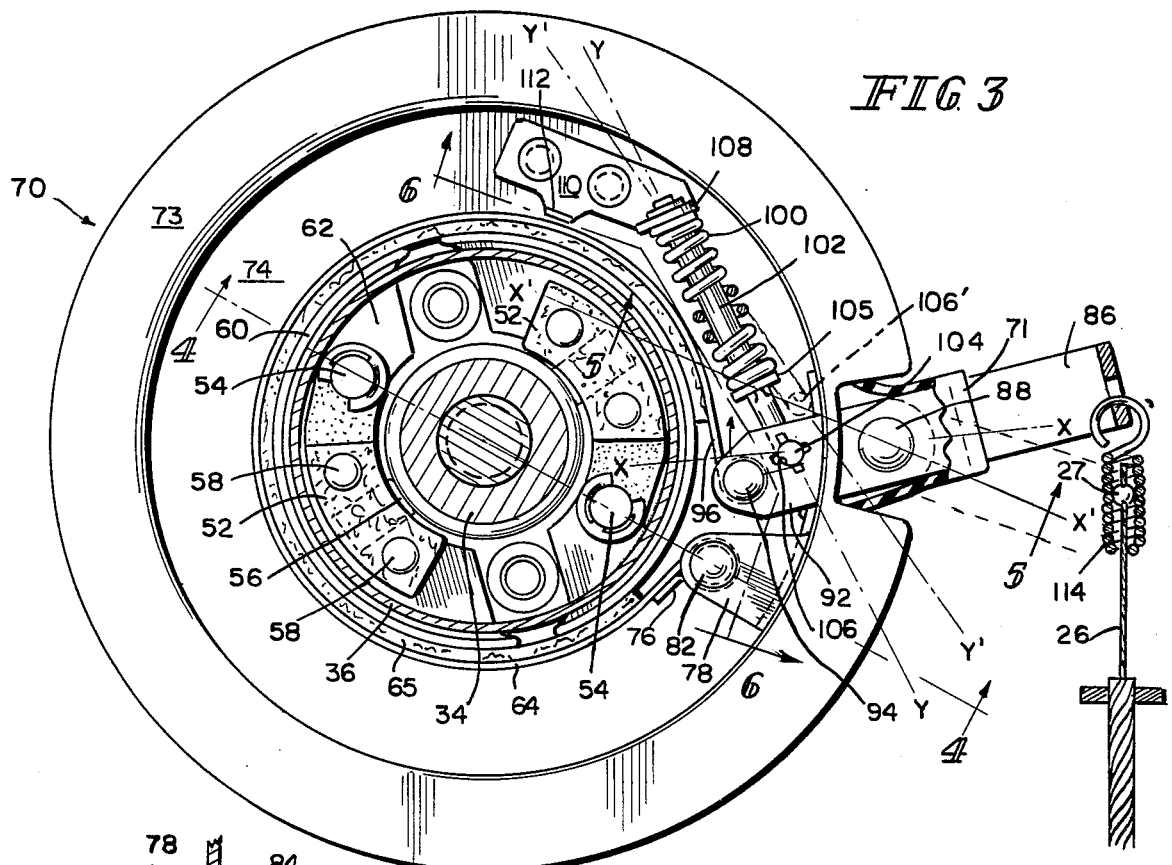
FIG. 3 is a horizontal section taken on the line 3—3 of FIG. 2.
Figure 4:
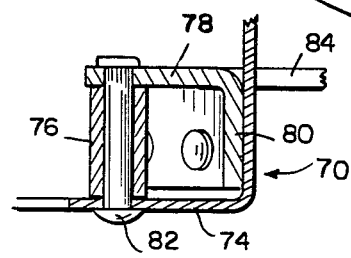
FIG. 4 is a partial section taken on the line 4—4 of FIG. 3, showing the anchoring of the fixed end of the brake band.
Figure 5:
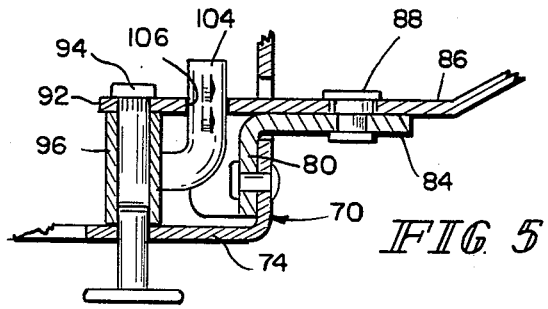
Figure 6:
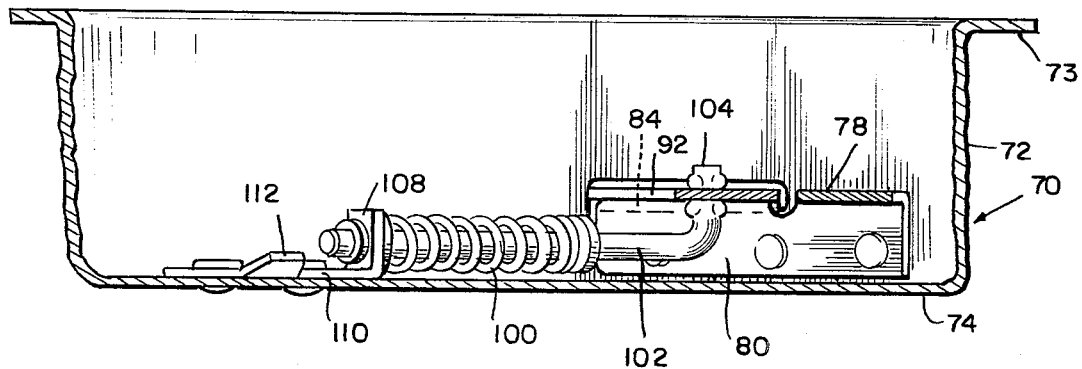

FIG. 5 is a partial section taken on the line 5—5 of FIG. 3, with the brake lever moved to brake-OFF position, showing the mounting of the brake lever and its connection to the movable end of the brake band, and showing that movable end temporarily held in full-OFF position by a removable pin, for purposes of assembling the bowl and brake band assembly with the clutch-brake assembly carried by the depending end of the engine shaft;

FIG. 6 is a view taken along the line 6—6, showing the brake-biasing spring and its guide rod mounted between the reaction bracket and the brake lever mounted on the bracket which anchors the fixed end of the brake band and to which the brake lever is pivoted; and FIG. 7 is a partial section like FIG. 2 but showing a self-propelled lawn mower.

The lawn mower 10 shown in FIG. 1 comprises an engine 12 mounted by a mounting flange 14 on the deck 16 of a molding or casting which forms a frame to which the wheels of the lawn mower are mounted. A handle 20 is pivotally connected to the frame and extends rearward and upward to a handlebar 22 which is gripped by the operator as he pushes or guides the lawn mower in its operations. A deadman lever 24 is pivoted to the handle 20 and is movable from a released position shown in full lines to an actuated position shown in dotted lines where it can be held in actuated position by the hand of the operator. The deadman lever is connected by a cable 26 to control the clutch-brake mechanism as described below. The engine shown is governed at a constant operating speed and has no manual speed control. The present invention is especially adapted for use with such an engine, since it provides declutching and braking of the blade without reducing the engine speed. The invention is also applicable, however, to engines with manual speed controls.

As shown in FIGS. 2 and 3, the engine shaft has a depending end 28 on which a cluth-brake assembly 30 is mounted by a bolt 32. The clutch-brake assembly comprises a hub 34 which is keyed to the shaft end 28 to rotate therewith and which carries a driving drum 36 having a depending cylindrical outer wall. Preferably, the hub 34 also carries a flywheel 38 formed of an assembly of sheet metal stampings riveted together and to the web of the driving drum 36. The hub 34 may be of non-circular section within the flywheel and web of the driving drum 36 so that such parts are locked to the hub 34 for rotation therewith. The lower end of the hub 34 contains an insert 40 of reduced diameter on which is mounted the inner race of a ball bearing set 42. The outer race of such ball bearing is received in the upper portion of a hat section member 44 having a brim portion fixed to an annular plate 46. The hat section member 44 and plate 46 form a blade carrier 45, to which the rotary mower blade 50 is removably attached by cap screws 48.

As more fully explained in my co-pending application Ser. No. 06/158,700, clutch shoes 52 are pivotally mounted on the brim portion of the blade carrier 45 by pivot pins 54 at the leading ends of such shoes, and are spring-pressed outward by springs 56 mounted in cavities in the shoes and reacting against the upper portion of the hat section 44. The shoes are thus spring-pressed outward against the inner face of the drum 36 and biased to driving engagement with such drum. A generally semi-cylindrical brake drum segment 60 is disposed outside and in clearance relation with the driving drum 36 and has an inward-extending flange 62 fixed to each clutch shoe 52 as by rivets 58. A brake band 64 surrounds the brake segments 60 and is movable between an expanded condition in which it clears the brake segments 60 and a contracted position in which it engages the brake segments 60 and forces them inward to the position shown in FIG. 3, where the brake is ON and the clutch shoes disengaged.

The operation of this clutch-brake mechanism as so far described is like that of my co-pending application. When the brake band is expanded, the brake segments are free to move outward, and the shoe and brake segment assemblies pivoted on the pivots 54 swing outward under the bias of the clutch springs 56 to carry the clutch shoes 52 into initial engagement with the driving drum 36. This initiates rotation of the rotary blade 50 and quickly but smoothly accelerates it to cutting velocity. As the shoes 52 move into engagement with the driving drum, the brake segments 60 swing outward about the pivots 54 to a position in which their trailing ends lie outward of a cylindrical position about the axis of rotation, and their mass combines with the mass of the clutch shoes 52 to generate centrifugal force urging the shoes into tighter engagement with the driving drum. The shoes are self-energizing, and the clutch at normal operating speeds is substantially locked up so that there is little or no slippage between the driving drum and the driven blade carrier. When the brake band is contracted to a brake-ON position, it engages the brake segments and physically forces them inward to a cylindrical position, and their movement is transmitted to the clutch shoes 52 to move them inward out of clutching engagement with the driving drum 36 so that the driving relation between such drum 36 and the driven blade carrier is interrupted. The brake band than acts on the brake segments 60 to brake the blade carrier to a stop.

In accordance with the present invention, the clutch-brake mechanism as thus described is housed in a protective bowl 70 which may be of relatively thin sheet metal. The bowl has a cylindrical side wall 72 connected at its upper end to a mounting flange 73 which overlies the lawn mower deck 16 and underlies the engine-mounting flange 14. The side wall 72 of the bowl extends downward to a level adjacent the inward flanges 62 of the brake segments 60, and there connects with a bottom wall 74 which extends into close clearance relation with such brake segments 60. The brake band 64 overlies the inner periphery of such bottom wall 74 and is supported throughout its circumferential length by the inner periphery of such bottom wall 74.

The fixed end of the brake band 64 is formed into a loop 76 which is received between the bottom wall 74 of the bowl 70 and an overlying inward-bent arm 78 of a bracket 80 mounted against the side wall 72 of the bowl, as by rivets. An anchor pin 82 extends through such arm 78, the loop 76, and the bottom wall 74, and is riveted in place. The bracket 80 also has an outward-extending arm 84, extending through a narrow opening formed in the side wall 72 of the bowl. A brake lever 86 is pivoted on such outward arm 84 by a pivot 88 in the form of a rivet. The outward end of the brake lever may take any of various forms to suit the design of the lawn mower, and is here shown as bent angularly and vertically upward to extend through a slot in the deck 16 to provide an actuation arm 90 for connection with the cable 26 from the deadman lever 24. The narrow opening is desirably covered and the brake lever pivot enclosed by a boot 71.

The inward arm 92 of the brake lever carries a depending pin 94 engaged in a loop 96 at the free end of the brake band 64. The two pins 82 and 94 to which the ends of the brake band are connected lie relatively close to each other and close to the path of the brake segments 60 so as to minimize the gap in the effective length of the brake band. As shown, the brake band 64 carries a lining 65 which extends over substantially 320° and has a gap between its ends of only about 40°.

The brake lever 86 is biased to brake-ON position by a compression coil spring 100 which surrounds a guide rod 102 extending through its length. The forward end of the rod has an upturned pivot end 104 engaged in a pivot hole 106 in the inner arm 92 of the brake lever 86, and the rearward end of the rod extends slidably through a bushing in a reaction support plate 108. The forward end of the spring bears against an abutment in the form of a washer 105 fixed on the guide rod 102, and its rearward end reacts against the plate 108 which is carried by a bracket 110 fixed on the bottom wall of the bowl 70. The inner edge of such plate desirably carries a brake-locating finger 112.

The pivot hole 106 in the brake lever which receives the upturned pivot end 104 of the spring guide rod is located intermediate the length of the lever arm 92 and close to the pin 94 to which the movable end of the brake band 64 is connected. It is offset slightly from the center line of the lever arm and lies on a line X—X extending through the brake lever pivot 88. Such line X—X is at an angle to the center line Y—Y of the spring 100, and such angle is close to but somewhat greater than a right angle, so that, on the one hand, the spring exerts a substantially maximum force tending to rotate the brake lever to its brake-ON position, and on the other hand, the angle increases significantly as the lever arm moves to brake-OFF position. In an exemplary embodiment and as shown, this angle is approximately 110°, and thus desirably close to but somewhat greater than 90°. As the brake lever 86 is moved from its brake-ON position shown in full lines in FIG. 3 to its brake-OFF position shown in dotted lines in FIG. 3, the pivot hole 106 and the upturned pivot end 104 of the brake guide rod move to the position 106' shown in dotted lines in FIG. 3, and the line connecting the centers of the lever arm pivot 88 and the guide rod pivot 104 pivots moves to the position X'—X'. This coincides with the line 5—5 on which FIG. 5 is taken. The center line of the spring also moves to the position Y'—Y'. The angle between the lines X'—X' and Y'—Y' is substantially greater, and in the preferred embodiment and as shown is an angle of approximately 150°. Because of this increased angle, the effective geometric lever arm by which the spring acts to bias the lever arm 93 toward brake-ON position is substantially reduced relative to the force of the spring. Accordingly, the component of force exerted by the spring in a direction tending to rotate the brake lever 86 to its brake-ON position is substantially reduced relative to the force exerted by the spring on the guide rod and along the center line Y'—Y' of the spring. The movement of the parts to the brake-OFF position also has the effect of compressing the spring, and thereby of increasing the force which it exerts along its center line. In a particular embodiment, the spring was preloaded so that the force it exerted along its center line when the brake lever was in ON position was approximately thirty pounds (30 lbs.), and this resulted in requiring a force of twenty pounds (20 lbs.) at the actuating end 90 of the brake lever to move that lever away from its brake-ON position. When the brake lever was moved to its brake-OFF position and the spring compressed, the spring then exerted a force of forty-three pounds (43 lbs.) on the guide rod and along its center line, but because of the reduction in the effective geometric lever arm and component of force tending to rotate the brake lever, resulting from the increased angle between the pivot center line X'—X' and the spring center line Y'—Y', the force required to maintain the brake lever in its brake-OFF position was not increased, and was indeed slightly reduced, despite the increased force exerted by the spring when compressed.

The actuation arm 90 of the brake lever is connected to the cable 26 by a combined free-travel and over-travel connector spring 114 shown in FIG. 3. This has a hook portion by which it is connected to the actuation arm 90, and has an elongated cylindrical spring portion and a reduced end portion. The cable extends through the opening in the reduced end portion and is fitted with a ball 27 adapted to move freely between the cylindrical portion of the spring connector but to engage in the reduced end portion. In the initial setting of the control mechanism, the ball 27 is normally spaced from the closed end of the connector spring 114, as shown in full lines in FIG. 3. As the cable is pulled by the deadman lever 24, such ball moves through a short length of free travel, for example, ⅜ to ½ inch, until it engages in the reduced end of the spring connector 114. Thereafter, the cable acts through that connector to pull the actuation arm 90 of the brake lever from its brake-ON position to its brake-OFF position. Desirably, the arrangement is such that the deadman lever 24 will produce some over-travel of the cable 26 and its ball 27 after the brake lever has reached its full brake-OFF position, and such over-travel is permitted by the elasticity of the spring connector 114, which is stressed and elongated sufficiently to permit the over-travel to occur and permit the deadman lever 24 to move against the handlebar 22 where it is to be held by the hand of the operator. In the particular embodiment referred to above where the brake-biasing spring 100 exerted a preload of thirty pounds, the cable 26 had a design strength in excess of two hundred pounds pull, and the over-travel spring connector 114 was designed to transmit a pull of only about fifty pounds (50 lbs.) from the cable 26 to the actuation arm 90 of the brake lever 86. This provides an ample amount of pull to actuate the brake lever from its normal ON position to its brake-OFF position against the force of the biasing spring 100, and provides a substantial safety factor against overstressing the biasing spring or the cable or other parts.

The operation of the clutch-brake control mechanism is as follows. The brake lever and the brake band are normally biased to brake-ON position by the strong and sturdy biasing spring 100, which is a compression spring mounted in a well-protected position and in a well-controlled arrangement surrounding the guide rod 102. With the brake band ON, the brake segments 60 are physically contracted to a substantially coaxial cylindrical position in which they hold the clutch shoes 52 in a disengaged position and moved inward against the outward-biasing force of their springs 56. There is then no clutching engagement between the driving drum 36 and the driven blade carrier 45, and the blade carrier is positively braked to a stop and held stationary by engagement of the brake band 64 with the two brake segments 60. When the operator desires to operate the blade, he actuates the deadman lever 24 from its OFF position shown in full lines in FIG. 1 to its actuated position against the handlebar 22 as shown in dotted lines in FIG. 1. This pulls the cable 26 to take up the free travel between the ball 27 on the cable and the connector spring 114 and then pulls the actuation arm 90 of the brake lever from its brake-ON to its brake-OFF position. This swings the movable end 96 of the brake band to an OFF position in which the brake band is expanded sufficiently to allow the brake segments to move outward, and thereby allow the brake shoes 52 to be moved into engagement with the driving drum 36. Such initial engagement is smooth and without stopping the engine, and the heavy blade is rapidly accelerated to a fully clutched position in which it rotates at the same speed as the engine shaft 28. As this acceleration occurs, centrifugal force is generated by the mass of the shoes 52 and the brake segments 60 which increases the force of engagement between the shoes 52 and the driving drum 36. The pivoted shoes are self-energizing, and such increased engagement force causes them to substantially lock up so that the blade carrier is substantially locked to the driving drum for rotation therewith and without slippage. This condition continues as long as the operator holds the deadman lever in actuated position, and while he thus holds the deadman lever, he is positioned far enough away from the rotating blade to be protected from injury by that blade.

If, for any reason, the operator releases the deadman lever 24, it is immediately moved to its released position as shown in full lines in 24, by reason of the stress in the spring connector 114, and more importantly, by reason of the force of the biasing spring 100 which acts strongly to move the brake lever 86 from its brake-OFF position to its brake-ON position. This causes the brake band to be contracted against the brake segments 60, and such contraction physically forces such brake segments inward about their pivots 54 so as to physically force the clutch shoes 52 out of engagement with the driving drum. The drive is then declutched from the blade carrier, and the brake band acts on the brake segment 50 to brake the blade carrier to a stop. This occurs well within the three seconds allowed by the existing Safety Standard, and normally within about one second. Such time is shorter than the time required for the operator to move from a position holding the deadman control at handlebar 22 to a position adjacent the lawn mower where he might be endangered by the blade if the blade were rotating.

The arrangement of the biasing spring 100 and its related parts tends strongly to preserve the safety factors for which the clutch-brake mechanism is provided on the lawn mower. The spring normally exerts a strong biasing force tending to apply the brake. It is a compression spring which is positively trapped and guided between abutments on and surrounding the guide rod 102, and it is not overly stressed in operation so that its failure is unlikely. In the event it breaks between its ends, it is still likely to exert some biasing force on the brake lever and brake band so that while the safety factor may be reduced, it is not completely eliminated. The reduced biasing force will be noticeable in the operation of the deadman lever and this will warn the operator that repair is necessary. The spring and its related parts are well protected from the environment in the blade chamber by the surround bowl 70, and the cylindrical shape of such bowl minimizes obstruction of the chamber during mowing operations. The arrangement is of relatively simple and inexpensive design and construction, yet provides positive and reliable action, particularly action on the brake lever and brake band. It permits the use of a relatively strong and sturdy spring while limiting the force required to release the brake and to hold it in released position. The control mechanism is thus of sturdy and reliable construction adapted to operate through a long life with a minimum likelihood of failure, and thus to preserve throughout such life the safety features for which the clutch-brake mechanism is originally provided.

The modification shown in FIG. 7 applies to a self-propelled lawn mower the clutch-brake mechanism described above and the controls therefor in accordance with the present invention. In that modification, the deck 116 is formed with an upward extending central collar 115 with a top flange 117 adapted to support the mounting flange 114 of the engine. The engine is mounted by bolts 119 which extend downward from the engine-mounting flange through the deck flange 117 and thence through stand-offs 121 and through the mounting flange 173 of a bowl 170 analogous to the bowl 70 described above. This positions the bowl in substantially the same position as in the modification of FIGS. 2–6 relative to the main top wall of the deck 116, but positions the engine 110 in an elevated position. The depending end 128 of the engine shaft is longer than in FIG. 2, and carries a pulley 129 above the hub 134 of the clutch and brake assembly mounted on the bottom end of such shaft 128. The clutch and brake assembly is the same as that of FIGS. 2–6. The pulley 129 is connected by a belt 131 to a lawn mower propulsion mechanism of any conventional type. In this case, where the engine directly drives the propulsion mechanism of the lawn mower, the engine 110 would normally be provided with a manual throttle control so that the speed of propulsion can be controlled by varying the engine speed.

The clutch and brake mechanism and the control of the present invention is especially useful with such a self-propelled mower, in that the blade can be positively declutched and braked to a stop regardless of the speed at which the engine shaft is turning. The blade control and speed control are thus substantially independent, and the mower can be self-propelled at any desired speed with the blade locked against rotation.

What is claimed is:

1. Lawn mower blade control mechanism having a driving drum mounted on the depending end of a drive shaft, a blade carrier mounted for coaxial rotation therewith and comprising clutch shoes movably mounted on said blade carrier and biased toward clutching engagement with said drum, brake drum segments connected to move the shoes to declutched position, and a brake band surrounding the brake drum segments and movable thereagainst to de-clutch the shoes and brake the blade carrier, wherein the improvement comprises a brake lever pivoted on a supporting pivot located radially outward from the path of said brake segments and having a lever arm extending generally radially inward from such pivot to a connection with a movable end of said brake band located close to said path, a spring reaction support spaced angularly from said movable end of the brake band, and a compression spring reacting against said reaction support and extending therefrom closely beside and tangentially along said movable end, means for connecting the free end of the spring for movement with and for transmitting force to said movable end of the brake band in a direction generally parallel with and in the same direction as the brake-engaging movement of said movable end, so as to apply spring force from said closely and tangentially disposed spring substantially directly to the movable end of the brake band to bias the same to brake-engaged position, and means adapted to be actuated manually by the lawn mower operator for moving said lever arm and movable end of the brake band, against the bias of said spring, to disengage the brake band from engagement with said brake drum segments and thereby permit said clutch shoes to move into engagement with said driving drum, wherein said means for connecting the free end of the spring and transmitting force therefrom to the movable end of the brake band comprises means connecting such free end to a thrust point on said lever arm between its pivot axis and its connection with the movable end of the brake band so that when said lever is in brake-ON position, the spring exerts thrust thereon along a thrust line at an angle close to 90° to a line connecting the lever pivot to the thrust point.

2. Control mechanism as in claim 1 with the addition of a spring guide rod pivotally connected to said lever arm at one end and extending slidably through the spring-reaction support, the spring being a coil spring surrounding said guide rod and acting between an abutment on the rod and said reaction support.

3. Control mechanism as in claim 1 in which the angle between the line of thrust of the spring and the radius connecting the lever arm pivot and said thrust point on the lever arm is a small amount greater than 90° when the lever arm is in brake-ON position, and is substantially increased as the lever arm is moved to brake-OFF position and the spring is thereby compressed, so as to progressively reduce the effective lever arm through which the spring force opposes such movement as the movement occurs.

4. Lawn mower blade control mechanism having a driving drum mounted on the depending end of a drive shaft, a blade carrier mounted for coaxial rotation therewith and comprising clutch shoes movably mounted on said blade carrier and biased toward clutching engagement with said drum, brake drum segments connected to move the shoes to declutched position, and a brake band surrounding the brake drum segments and movable thereagainst to de-clutch the shoes and brake the blade carrier, wherein the improvement comprises a brake lever pivoted on a supporting pivot located radially outward from the path of said brake segments and having a lever arm extending inward from such pivot to a connection with a movable end of said brake band located close to said path, a compression spring disposed closely beside and along a portion of said brake band adjacent said movable end and connected to act between a reaction support and a thrust point on said lever arm between its pivot and its connection with said brake band for biasing the brake band to engaged position, the angle between the line of thrust of the spring and the line connecting the lever arm pivot and said thrust point on the lever arm being a small amount greater than 90° when the lever arm is in brake-ON position, and being substantially increased as the lever arm is moved to brake-OFF position and the spring is thereby compressed, so as to progressively reduce, relative to the spring force, the component of force opposing such movement as such movement occurs, and means adapted to be actuated manually by the lawn mower operator for moving said lever arm, against the bias of said spring, to disengage the brake band from engagement with said brake drum segments and thereby permit said clutch shoes to move into engagement with said driving drum.

5. Control mechanism as in claim 4 in which the progressive reduction of the component of force opposing movement of the lever arm substantially offsets the increase in spring force resulting from its compression during such movement whereby the effort required to hold the lever arm in brake-OFF position is not substantially greater than the effort required to move the lever arm from brake-ON position.

6. Control mechanism as in claims 1, or 4 in which said brake band extends circumferentially about said brake drum segments to an anchor point close to the connection of said movable end thereof to said lever arm and has an effective braking surface about said brake drum segments over an arc of the order of 300°.

7. Control mechanism as in claim 6 in which the brake band has a lining providing an effective braking surface over an arc of the order of 300°.

8. Control mechanism as in claims 1 or 4 in which the drive shaft carries a flywheel rotatable with the driving drum and extending radially beyond said drum, and said compression spring and its connection to said lever arm lie wholly within the circumference of the flywheel.

9. Safety control mechanism for the rotary blade of a lawn mower having a deck, an engine mounted by a base flange about the periphery of an opening in the deck, and having a drive shaft depending below the deck, a driving drum mounted on the depending end of a drive shaft, a blade carrier mounted for coaxial rotation therewith and comprising clutch shoes movably mounted on said blade carrier and biased toward clutching engagement with said drum, brake drum segments connected to move the shoes to declutched position, a brake band surrounding the brake drum segments and movable thereagainst to declutch the shoes and brake the blade carrier, and a protective bowl depending from the deck, having a side wall surrounding and radially spaced from the brake band, and having a bottom wall extending into close clearance relation with said blade carrier, wherein the improvement comprises a brake lever pivoted on a supporting pivot on said bowl and located radially outward from the path of said brake segments, said lever having a lever arm extending generally radially inward from such pivot to a connection with a movable end of said brake band located close to said path, a spring reaction support on said bowl, a compression spring connected to act between such reaction support and a thrust point on said lever arm positioned within said bowl and between the supporting pivot for the brake lever and the connection of said lever arm with said brake band for biasing the brake band to engaged position, said spring extending closely beside and tangentially along the movable end of the brake band and acting along a thrust line at an angle close to 90° to a line connecting the thrust point to the lever pivot, so as to exert a strong rotative force on said lever arm and brake band and to be disposed in compact relation with the brake band and within the bowl, and means adapted to be actuated manually by the lawn mower operator for moving said lever arm, against the bias of said spring, to disengage the brake band from engagement with said brake drum segments and thereby permit said clutch shoes to move into engagement with said driving drum.

10. Control mechanism as in claim 9 wherein said bottom wall of the bowl supports the brake band for movement between engaged and disengaged position with respect to the brake drum segments.

11. Control mechanism as in claim 10 in which one end of the brake band is anchored to an anchor pin engaged in an opening in the bottom wall of the bowl and in a supporting arm extending inward from the side wall of the bowl.

12. Control mechanism as in claims 9 or 10 in which said brake lever is pivoted to a support arm extending outward from the side wall of said bowl and said pivot is spaced outward from such side wall, the side wall having a slot through which the lever arm extends to its connection with the movable end of the brake band.

13. Control mechanism as in claim 12 in which said lever arm carries a connector pin engaged in a loop at the movable end of the brake band and such movable end is slidable on the bottom wall of the bowl and is held between such bottom wall and an overlying portion of said lever arm.

14. Control mechanism as in claim 9, further comprising a guide rod pivotally connected to said lever arm at one end and extending slidably through the spring-reaction support, the spring being a coil spring surrounding the rod and acting between an abutment thereon and said reaction support, said spring and rod being wholly contained within the bowl between the brake band and the side wall of the bowl.

15. Control mechanism as in claims 9, 10, or 14 in which the drive shaft carries a flywheel, and the side wall of the bowl extends downward from the periphery of such opening and closely surrounds the flywheel, said flywheel and side wall being of a size to pass in close clearance relation through the deck opening, the blade carrier and its shoes and brake drum segments being diametrically smaller than the flywheel and the brake band, and the biasing spring and the inner end of the lever arm being contained within the bowl below the flywheel.

16. Control mechanism as in claim 9 or 14 in which the spring extends chordally of the bowl between the side wall thereof and the brake band.

17. Control mechanism as in claim 14 in which the brake lever arm lies adjacent the top edge of the brake band, and the guide rod has a rod portion extending through the spring and disposed below the level of such lever arm and has an upstanding pivot portion engaged in a pivot hole in the lever arm.

* * * * *